(12) United States Patent
Jackson

(10) Patent No.: US 12,162,551 B1
(45) Date of Patent: Dec. 10, 2024

(54) BICYCLE WITH SECURITY FEATURES

(71) Applicant: James Jackson, Philadelphia, PA (US)

(72) Inventor: James Jackson, Philadelphia, PA (US)

( * ) Notice: Subject to any disclaimer, the term of this patent is extended or adjusted under 35 U.S.C. 154(b) by 776 days.

(21) Appl. No.: 17/373,830

(22) Filed: Jul. 13, 2021

(51) Int. Cl.
| | |
|---|---|
| *B62J 50/00* | (2020.01) |
| *B62H 5/00* | (2006.01) |
| *B62H 5/20* | (2006.01) |
| *B62J 43/30* | (2020.01) |
| *B62J 45/41* | (2020.01) |
| *B62K 3/02* | (2006.01) |
| *G08B 3/10* | (2006.01) |
| *G08C 17/02* | (2006.01) |
| *G01S 19/16* | (2010.01) |

(52) U.S. Cl.
CPC .............. *B62H 5/003* (2013.01); *B62H 5/20* (2013.01); *B62J 43/30* (2020.02); *B62J 45/41* (2020.02); *B62J 50/00* (2020.02); *B62K 3/02* (2013.01); *G08B 3/10* (2013.01); *G08C 17/02* (2013.01); *G01S 19/16* (2013.01)

(58) Field of Classification Search
CPC .. B62H 5/003; B62H 5/20; B62J 45/41; B62J 50/00; B62J 43/30; B60K 3/02; G08B 3/10; G08C 17/02; G01S 19/16
USPC ......................................................... 340/427
See application file for complete search history.

(56) References Cited

U.S. PATENT DOCUMENTS

| | | | |
|---|---|---|---|
| 6,945,081 B1 | 9/2005 | Lopes | |
| 8,756,960 B2 | 6/2014 | Poehlmann | |
| D721,013 S * | 1/2015 | Fragassi | D12/111 |
| 9,604,695 B2 * | 3/2017 | Hensley | B62H 5/001 |
| 10,308,130 B2 | 6/2019 | Lisanti | |
| 10,701,519 B2 | 6/2020 | Olmheim | |
| 11,820,451 B1 * | 11/2023 | Margeta | B62H 5/003 |
| 2013/0150028 A1 * | 6/2013 | Akins | H04W 4/029 |
| | | | 455/456.3 |
| 2014/0109631 A1 * | 4/2014 | Asquith | E05B 45/06 |
| | | | 340/427 |
| 2014/0290314 A1 * | 10/2014 | Poehlmann | E05B 67/003 |
| | | | 70/18 |
| 2015/0204112 A1 * | 7/2015 | Salzmann | B62H 5/20 |
| | | | 70/15 |
| 2016/0221627 A1 * | 8/2016 | Hines | B62J 6/056 |
| 2018/0118294 A1 * | 5/2018 | Anuth | B62H 5/147 |
| 2018/0327040 A1 | 11/2018 | Spicer | |
| 2022/0073161 A1 * | 3/2022 | Savard | E05B 71/00 |

FOREIGN PATENT DOCUMENTS

WO 2017111613 6/2017

* cited by examiner

*Primary Examiner* — Naomi J Small

(57) ABSTRACT

The bicycle with security features includes a frame, a cable lock, a pedal lock, a motion alarm, a GPS tracker, a solar cell array, a smart phone interface, a battery, and a battery charger. The frame may house anti-theft and rider safety features. The cable lock and the pedal lock may prevent a bicycle from being moved by thieves. The motion alarm may produce an alert if the bicycle is disturbed. The GPS tracker may determine and report the location of the bicycle. The anti-theft and rider safety features may be controlled from a smart phone.

15 Claims, 4 Drawing Sheets

BICYCLE WITH SECURITY FEATURES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of bicycles and personal safety, more specifically, a bicycle with security features.

SUMMARY OF INVENTION

The bicycle with security features comprises a frame, a cable lock, a pedal lock, a motion alarm, a GPS tracker, a solar cell array, a smart phone interface, a battery, and a battery charger. The frame may house anti-theft and rider safety features. The cable lock and the pedal lock may prevent a bicycle from being moved by thieves. The motion alarm may produce an alert if the bicycle is disturbed. The GPS tracker may determine and report the location of the bicycle. The solar cell array is used to generate electricity. The anti-theft and rider safety features may be controlled from a smart phone.

An object of the invention is to provide a bicycle comprising anti-theft and rider safety features.

Another object of the invention is to provide a cable lock incorporated into the frame of the bicycle, a pedal lock that may be activated remotely, and a GPS tracker for locating the bicycle.

A further object of the invention is to provide a motion alarm for indicating unauthorized movement of the bicycle, a solar cell array on the rear of the bicycle, a battery for powering the anti-thefts and rider safety features, and a battery charger that is operational coupled to a sprocket of the crankset.

Yet another object of the invention is to remotely monitor and control the anti-theft and rider safety features wirelessly from a smart phone via a smart phone interface.

These together with additional objects, features and advantages of the bicycle with security features will be readily apparent to those of ordinary skill in the art upon reading the following detailed description of the presently preferred, but nonetheless illustrative, embodiments when taken in conjunction with the accompanying drawings.

In this respect, before explaining the current embodiments of the bicycle with security features in detail, it is to be understood that the bicycle with security features is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bicycle with security features.

It is therefore important that the claims be regarded as including such equivalent construction insofar as they do not depart from the spirit and scope of the bicycle with security features. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
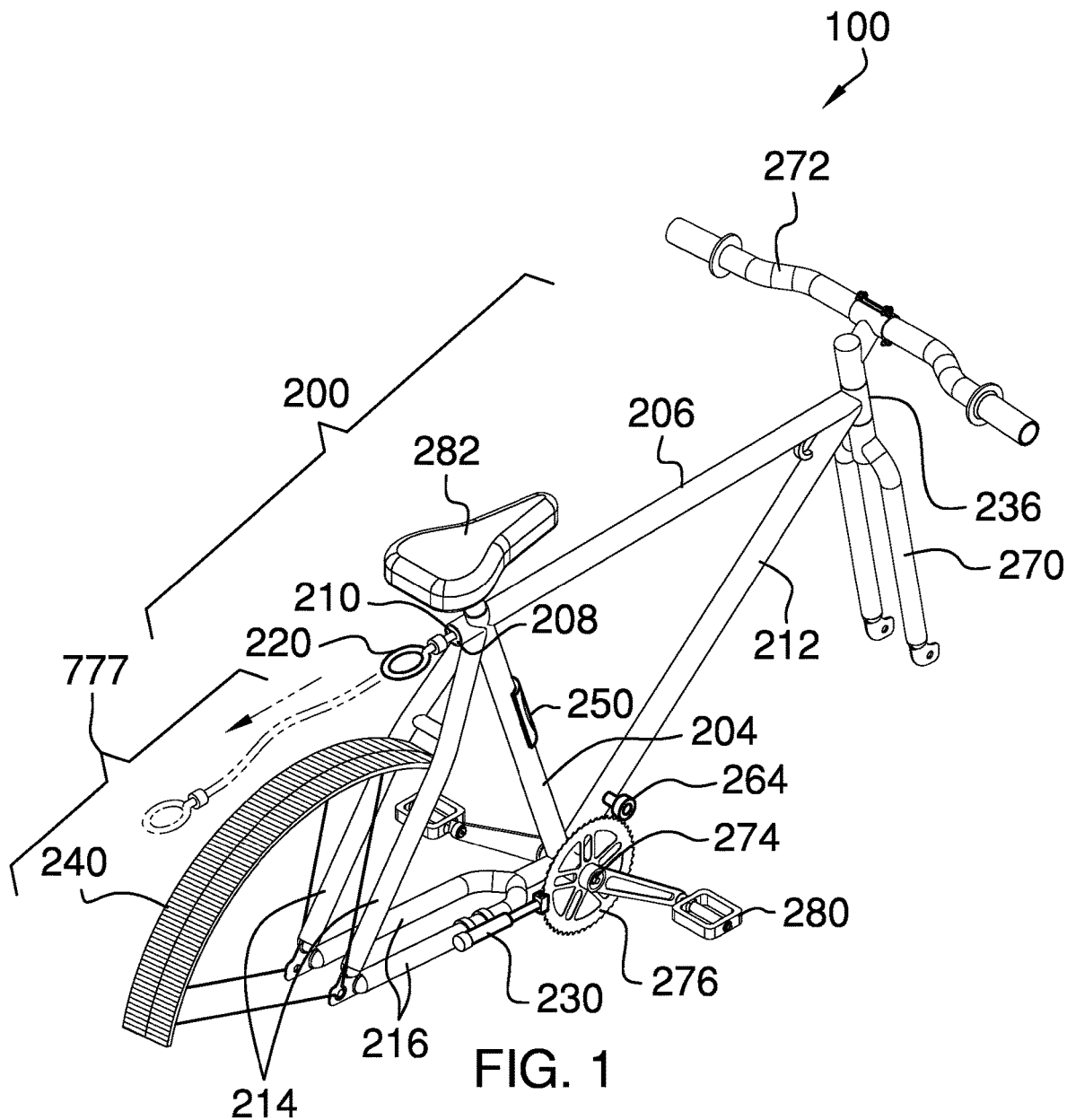
FIG. 1 is an isometric view of an embodiment of the disclosure.
Figure 2:
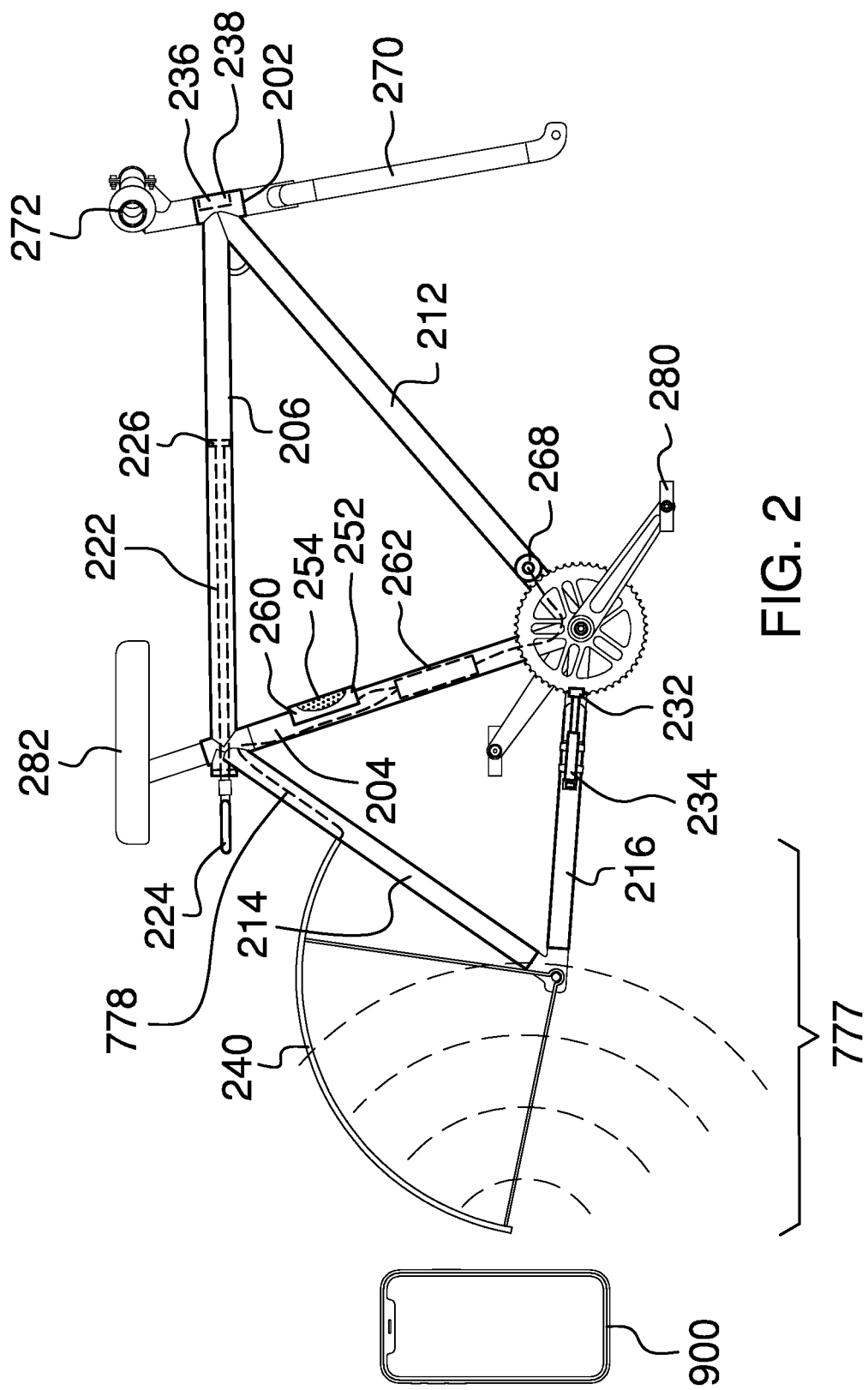
FIG. 2 is a side view of the embodiment of the disclosure.
Figure 3:
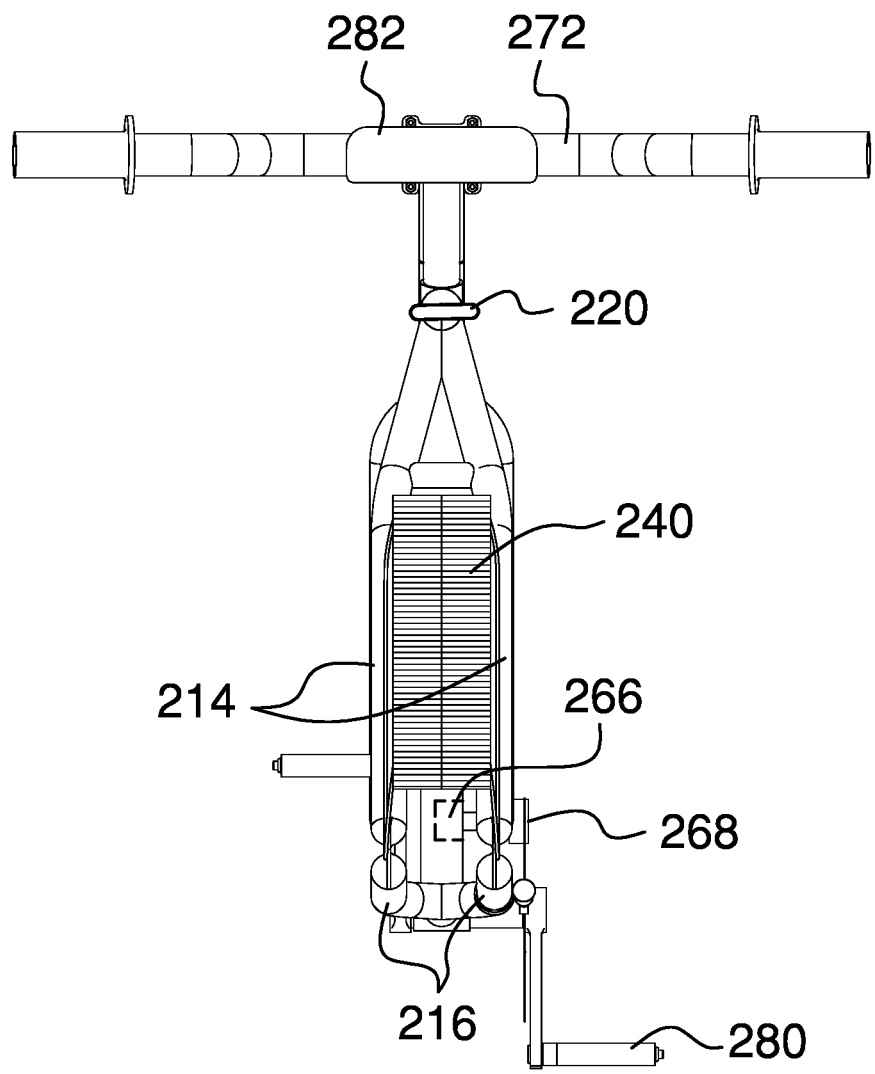
FIG. 3 is a rear view of the embodiment of the disclosure.
Figure 4:
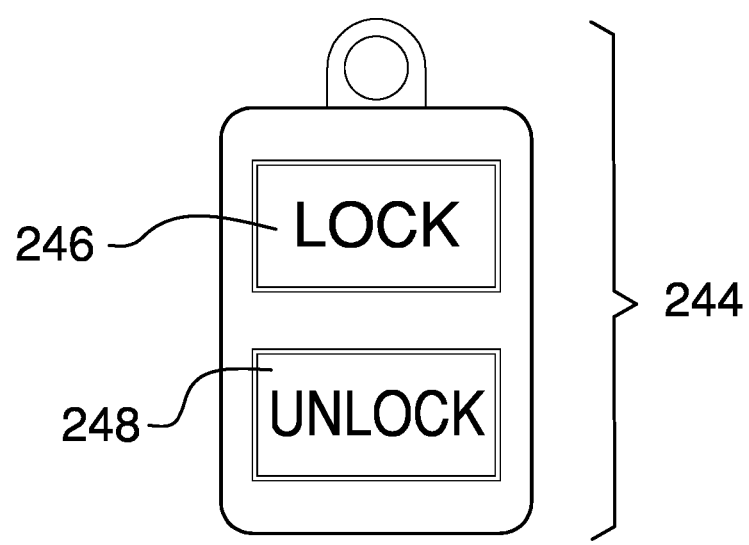
FIG. 4 is a detail view of the embodiment of the disclosure illustrating the key fob.

Detailed reference will now be made to a first potential embodiment of the disclosure, which is illustrated in FIGS. 1 through 4.

The bicycle with security features 100 (hereinafter invention) comprises a frame 200, a cable lock 220, a pedal lock 230, a motion alarm 250, a GPS tracker 236, a solar cell array 240, a smart phone interface 260, a battery 262, and a battery charger 264. The frame 200 may house anti-theft and rider safety features. The cable lock 220 and the pedal lock 230 may prevent a bicycle from being moved by thieves. The motion alarm 250 may produce an alert if the bicycle is disturbed. The GPS tracker 236 may determine and report the location of the bicycle. The solar cell array 240 is used to create electricity that is used to recharge the battery 262. The anti-theft and rider safety features may be controlled from a smart phone 900.

The frame 200 may be adapted to be combined with a fork 270, a handlebars 272, a crankset 274, a pedals 280, a seat 282, a front wheel, and a rear wheel to complete the bicycle. The frame 200 may comprise a head tube 202, a seat tube 204, a down tube 212, a pair of seat stays 214, a pair of chain stays 216, and a top tube 206. The head tube 202 may be a vertically-oriented tube located at the front of the bicycle. The bottom of the head tube 202 may pivotably couple to the fork 270. The handlebars 272 may couple to the fork 270 at the top of the head tube 202.

The seat tube 204 may be a vertically-oriented tube located at a midpoint of the bicycle. The seat 282 may be coupled to the top of the seat tube 204. The bottom of the seat tube 204 may couple to the front of the pair of chain stays 216 and to the bottom of the down tube 212. The down tube 212 may be angled at an oblique angle relative to the ground. The front of the down tube 212 may be coupled to the head tube 202 and the rear of the down tube 212 may be coupled to the bottom of the seat tube 204.

The pair of seat stays 214 may be a pair of tubes that straddle the rear wheel and are angled at an oblique angle relative to the ground. The pair of chain stays 216 may be a pair of horizontally-oriented tubes that straddle the rear wheel. The rear of each of the pair of chain stays 216 may be coupled to the corresponding one of the pair of seat stays 214. The fronts of the pair of chain stays 216 may be coupled to the bottom of the seat tube 204. The tops of the pair of seat stays 214 may be coupled to the top of the seat tube 204.

The top tube 206 may be a horizontally-oriented hollow tube. The front of the top tube 206 may couple to the head tube 202. The rear of the top tube 206 may pass through the top of the seat tube 204 and may couple to the top of the seat tube 204 such that the rear end of the top tube 206 is exposed behind the seat tube 204. The rear end of the top tube 206 may comprise a rear restrictor 208 which terminates the top tube 206. The rear restrictor 208 may comprise a rear aperture 210 that has a narrower diameter than the inside diameter of the top tube 206.

The cable lock 220 may comprise a cable 222, a loop 224, and a stopper 226. The cable lock 220 may be operable to fasten the bicycle to a stationary object such that the bicycle may not be moved away from the stationary object. As non-limiting example, the stationary object may be a pole, a tree, or a bike rack. The loop 224 and the stopper 226 may be coupled to opposing ends of the cable 222 with the loop 224 outside of the top tube 206 and the stopper 226 inside of the top tube 206. The cable 222 may pass through the rear aperture 210 located on the rear restrictor 208 at the rear end of the top tube 206. The loop 224 may be pulled to extract the cable 222 from within the top tube 206 for use. The stopper 226 may limit the distance that the cable 222 may be extracted. The cable 222 may be pushed into the top tube 206 when not in use. The cable lock 220 may be deployed by pulling the cable 222 from the top tube 206, passing the loop 224 around the stationary object, and coupling the loop 224 to the cable 222 using a padlock.

The pedal lock 230 may comprise a pedal lock head 232 and an activator 234. The pedal lock 230 may be operable to immobilize the bicycle by pushing the pedal lock head 232 against a sprocket 276 of the crankset 274. When deployed, the pedal lock head 232 may move towards the sprocket 276 and may engage the sprocket 276 such that the sprocket 276 may not turn.

When not deployed, the pedal lock head 232 may move away from the sprocket 276 such that the sprocket 276 is free to turn without interference from the pedal lock head 232. The pedal lock head 232 may be moved by the activator 234. The activator 234 may electromechanically move the pedal lock head 232 towards or away from the sprocket 276. The activator 234 may be adapted to be controlled by the user via a key fob 244 which the user may carry. The key fob 244 may comprise a lock control 246 and an unlock control 248. The key fob 244 may wirelessly signal the activator 234 to move the pedal lock head 232 towards the sprocket 276 when the lock control 246 is depressed. The key fob 244 may wirelessly signal the activator 234 to move the pedal lock head 232 away from the sprocket 276 when the unlock control 248 is depressed.

The motion alarm 250 may comprise a motion detector 252 and an audible transducer 254. The motion alarm 250 may produce the alert when the motion detector 252 senses that the bicycle has been moved if the motion alarm 250 is enabled. The motion alarm 250 may indicate the alert by activating the audible transducer 254 to produce an audible sound.

The GPS tracker 236 may determine the location of the bicycle using a constellation of orbiting satellites. The GPS tracker 236 may be adapted to wirelessly convey a location information to the user via a wireless interface 238. As non-limiting examples, the GPS tracker 236 may convey the location information to the smart phone 900 belonging to the user via Bluetooth, NFC, Zigbee, WiFi, a cellular phone network, or combinations thereof. The GPS tracker 236 may assist in navigation. The GPS tracker 236 may be adapted to report the location of a stolen bicycle to the user by communicating the location information wirelessly to the user.

The solar cell array 240 is located on a rear 777 portion of the frame 200 of the bicycle. The solar cell array 240 is used to create electricity, which recharges the battery 262.

The smart phone interface 260 may comprise a wireless communication link between the bicycle and the smart phone 900. The smart phone interface 260 may be packaged with any of the electronics that comprise the anti-theft and rider safety features. The smart phone interface 260 may be adapted to control operation of the anti-theft and rider safety features from the smart phone 900 and to report status of the anti-theft and rider safety features to the smart phone 900. As non-limiting examples, using the smart phone interface 260, an application program executing on the smart phone 900 may lock or unlock the pedal lock 230, determine the lock state of the pedal lock 230, display the location information obtained from the GPS tracker 236, receive the alert from the motion alarm 250, determine the activation state of the motion alarm 250, reset the motion alarm 250, monitor the charge level of the battery 262, or combinations thereof.

The battery 262 may comprise one or more energy-storage devices. The battery 262 may be a source of electrical energy to operate the pedal lock 230, the GPS tracker 236, the motion alarm 250, the smart phone interface 260, or combinations thereof. The battery 262 may be replaceable or rechargeable. As previously mentioned, the battery 262 is in wired connection with the solar cell array 240 via wiring 778 (see FIG. 2).

The battery charger 264 may comprise a sprocket drive wheel 268 and a generator 266. The battery charger 264 may be operable to recharge the battery 262 utilizing kinetic energy from rotation of the sprocket 276 of the crankset 274. The sprocket drive wheel 268 may be positioned where the sprocket drive wheel 268 may engage the sprocket 276 such that each rotation of the sprocket 276 may rotate the sprocket drive wheel 268 one or more times. The sprocket drive wheel 268 may be coupled to the generator 266 such that rotation of the sprocket drive wheel 268 may cause the generator 266 to produce an electrical potential which may be delivered to the battery 262 in order to recharge the battery 262.

In use, the bicycle may be used to transport the user who may power the bicycle by pedaling. While riding, the user may activate the solar cell array 240 to call attention to the presence of the bicycle and the user on the road. While riding, rotation of the sprocket 276 of the crankset 274 may cause the battery charger 264 to recharge the battery 262.

When the user parks the bicycle, the user may activate one or all of the anti-theft and rider safety features to reduce the likelihood of theft:

The user may secure the cable lock 220 around a stationary object.

The user may activate the pedal lock 230 wirelessly using the smart phone 900.

The user may activate the motion alarm 250 wirelessly using the smart phone 900.

The user may determine the location information from the GPS tracker 236 wirelessly using the smart phone 900.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, an "application" or "app" may be software that is specifically designed for use with a personal computing device.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "Bluetooth" may refer to a standardized communication protocol that is used to wirelessly interconnect electronic devices. Bluetooth® is a registered trademark of Bluetooth SIG.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used here, "crankset" may refer to that portion of a bicycle that converts reciprocating motion of a rider's legs into rotational motion used to move the chain or belt. As non-limiting examples, a crankset may comprise one or more sprockets, a crank axle, cranks, or combinations thereof. The pedals may couple to the cranks.

As used herein, the words "data" and "information" may be used interchangeably to refer to raw, unprocessed facts and to facts that have been processed, structured, organized, or presented in a context that makes the facts useful.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" may indicate the side of an object that is closest to a forward direction of travel under normal use of the object or the side or part of an object that normally presents itself to view or that is normally used first. "Rear" or "back" may refer to the side that is opposite the front.

In this disclosure, a "generator" converts rotational mechanical energy into electric energy.

As used herein, "GPS" may refer to a device that uses signals received from a system of navigational satellites to determine the position of the device. GPS is an acronym for Global Positioning System.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "inside diameter" or "inner diameter" may refer to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead may be within 50% of the distance from the exact midpoint to the farthest edge, farthest end, or farthest corner.

As used in this disclosure, "near field communication" commonly called NFC, may refer to an RFID technology and communication protocol that is commonly implemented on personal data devices.

As used herein, "oblique angle" may refer to any angle that is not a right angle or a multiple of a right angle.

As used herein, "pair", "paired", and "pairing" may refer to a connection established between two wireless devices or to the process of establishing such a connection.

As used herein, "random" may refer to an outcome which cannot be predicted in advance or to a sequence that lacks a definite pattern. Unless stated otherwise, random includes both truly random and pseudorandom outcomes and sequences. Pseudorandom may refer to an outcome or sequence that is selected by a definite computational process but that satisfies one or more standard tests for statistical randomness.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities. A smartphone may be able to execute downloaded application programs that expand the capabilities of the smartphone.

As used in this disclosure, a "transducer" may be a device that converts a physical quantity, such as pressure or brightness into an electrical signal or a device that converts an electrical signal into a physical quantity.

As used in this disclosure, "vertical" may refer to a direction that is parallel to the local force of gravity. Unless specifically noted in this disclosure, the vertical direction is always perpendicular to horizontal.

As used in this disclosure, "WiFi" may refer to the physical implementation of a collection of wireless electronic communication standards commonly referred to as IEEE 802.11x and used for wireless communication between devices.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A bicycle with security features comprising:
   a frame, a cable lock, a pedal lock, a motion alarm, a GPS tracker, a solar cell array, a smart phone interface, a battery, and a battery charger;
   wherein the frame houses anti-theft and rider safety features;
   wherein the cable lock and the pedal lock prevent a bicycle from being moved;
   wherein the motion alarm produces an alert if the bicycle is disturbed;
   wherein the GPS tracker determines and reports the location of the bicycle;
   wherein the solar cell array creates electricity used to recharge the battery;
   wherein the anti-theft and rider safety features is operable to be controlled from a smart phone;
   wherein the frame comprises a head tube, a seat tube, a down tube, a pair of seat stays, a pair of chain stays, and a top tube;
   wherein the rear restrictor comprises a rear aperture that has a narrower diameter than an inside diameter of the top tube;
   wherein the cable lock comprises a cable, a loop, and a stopper;
   wherein the cable lock is operable to fasten the bicycle to a stationary object such that the bicycle is not moved away from the stationary object;
   wherein the loop and the stopper are coupled to opposing ends of the cable with the loop outside of the top tube and the stopper inside of the top tube;
   wherein the cable passes through the rear aperture located on the rear restrictor at the rear end of the top tube;
   wherein the loop is pulled to extract the cable from within the top tube for use;
   wherein the stopper limits a distance that the cable is extracted;
   wherein the cable is pushed into the top tube when not in use.

2. The bicycle with security features according to claim 1 wherein the frame is adapted to be combined with a fork, a handlebars, a crankset, a pedals, a seat, a front wheel, and a rear wheel to complete the bicycle;
   wherein the head tube is a vertically-oriented tube located at the front of the bicycle;
   wherein the bottom of the head tube pivotably couples to the fork;
   wherein the handlebars couple to the fork at the top of the head tube.

3. The bicycle with security features according to claim 2 wherein the seat tube is a vertically-oriented tube located at a midpoint of the bicycle;
   wherein the seat is coupled to the top of the seat tube;
   wherein the bottom of the seat tube couples to the front of the pair of chain stays and to the bottom of the down tube;
   wherein the down tube is angled at an oblique angle relative to the ground;
   wherein the front of the down tube is coupled to the head tube and the rear of the down tube is coupled to the bottom of the seat tube.

4. The bicycle with security features according to claim 3 wherein the pair of seat stays is a pair of tubes that straddle the rear wheel and are angled at an oblique angle relative to the ground;
   wherein the pair of chain stays is a pair of horizontally-oriented tubes that straddle the rear wheel;
   wherein the rear of each of the pair of chain stays is coupled to the corresponding one of the pair of seat stays;
   wherein the fronts of the pair of chain stays are coupled to the bottom of the seat tube;
   wherein the tops of the pair of seat stays are coupled to the top of the seat tube.

5. The bicycle with security features according to claim 4 wherein the top tube is a horizontally-oriented hollow tube;
   wherein the front of the top tube couples to the head tube;
   wherein the rear of the top tube passes through the top of the seat tube and couples to the top of the seat tube such that the rear end of the top tube is exposed behind the seat tube.

6. The bicycle with security features according to claim 5 wherein the rear end of the top tube comprises a rear restrictor which terminates the top tube.

7. The bicycle with security features according to claim 6 wherein the cable lock is deployed by pulling the cable from the top tube, passing the loop around the stationary object, and coupling the loop to the cable using a padlock.

8. The bicycle with security features according to claim 7
wherein the pedal lock comprises a pedal lock head and an activator;
wherein the pedal lock is operable to immobilize the bicycle by pushing the pedal lock head against a sprocket of the crankset;
wherein when deployed, the pedal lock head moves towards the sprocket and engages the sprocket such that the sprocket is prevented from turning;
wherein when not deployed, the pedal lock head moves away from the sprocket such that the sprocket is free to turn without interference from the pedal lock head;
wherein the pedal lock head is moved by the activator;
wherein the activator electromechanically moves the pedal lock head towards or away from the sprocket.

9. The bicycle with security features according to claim 8
wherein the activator is adapted to be controlled by the user via a key fob;
wherein the key fob comprises a lock control and an unlock control;
wherein the key fob wirelessly signals the activator to move the pedal lock head towards the sprocket when the lock control is depressed;
wherein the key fob wirelessly signals the activator to move the pedal lock head away from the sprocket when the unlock control is depressed.

10. The bicycle with security features according to claim 9
wherein the motion alarm comprises a motion detector and an audible transducer;
wherein the motion alarm produces the alert when the motion detector senses that the bicycle has been moved if the motion alarm is enabled;
wherein the motion alarm indicates the alert by activating the audible transducer to produce an audible sound.

11. The bicycle with security features according to claim 10
wherein the GPS tracker determines the location of the bicycle using a constellation of orbiting satellites;
wherein the GPS tracker is adapted to wirelessly convey a location information to the user via a wireless interface;
wherein the GPS tracker assists in navigation;
wherein the GPS tracker is adapted to report the location of a stolen bicycle to the user by communicating the location information wirelessly to the user.

12. The bicycle with security features according to claim 11
wherein the smart phone interface comprises a wireless communication link between the bicycle and the smart phone;
wherein the smart phone interface is adapted to control operation of the anti-theft and rider safety features from the smart phone and to report status of the anti-theft and rider safety features to the smart phone.

13. The bicycle with security features according to claim 12
wherein using the smart phone interface, an application program executing on the smart phone locks or unlocks the pedal lock, determines the lock state of the pedal lock, displays the location information obtained from the GPS tracker, receives the alert from the motion alarm, determines the activation state of the motion alarm, resets the motion alarm, monitors the charge level of the battery, or combinations thereof.

14. The bicycle with security features according to claim 13
wherein the battery comprises one or more energy-storage devices;
wherein the battery is a source of electrical energy to operate the pedal lock, the GPS tracker, the motion alarm, the smart phone interface, or combinations thereof;
wherein the battery is replaceable or rechargeable;
wherein the battery is in wired connection with the solar cell array.

15. The bicycle with security features according to claim 14
wherein the battery charger comprises a sprocket drive wheel and a generator;
wherein the battery charger is operable to recharge the battery utilizing kinetic energy from rotation of the sprocket of the crankset;
wherein the sprocket drive wheel is positioned where the sprocket drive wheel engages the sprocket such that each rotation of the sprocket rotates the sprocket drive wheel one or more times;
wherein the sprocket drive wheel is coupled to the generator such that rotation of the sprocket drive wheel causes the generator to produce an electrical potential which is delivered to the battery in order to recharge the battery.

* * * * *